United States Patent
Startz et al.

(10) Patent No.: US 11,006,778 B2
(45) Date of Patent: May 18, 2021

(54) ELECTRICALLY OPERATED BEVERAGE MAKER (PREFERABLY COFFEE MACHINE) HAVING DYNAMIC MAINTENANCE PLAN GENERATION

(71) Applicant: WMF Group GmbH, Geislingen/Steige (DE)

(72) Inventors: Armin Startz, Weidenstetten (DE); Peter Arndt, Blaustein (DE)

(73) Assignee: WMF GROUP GMBH, Geislingen/Steige (DE)

( * ) Notice: Subject to any disclaimer, the term of this patent is extended or adjusted under 35 U.S.C. 154(b) by 117 days.

(21) Appl. No.: 15/571,779

(22) PCT Filed: May 3, 2016

(86) PCT No.: PCT/EP2016/059836
§ 371 (c)(1),
(2) Date: Nov. 3, 2017

(87) PCT Pub. No.: WO2016/177697
PCT Pub. Date: Nov. 10, 2016

(65) Prior Publication Data
US 2019/0125123 A1    May 2, 2019

(30) Foreign Application Priority Data
May 6, 2015  (DE) .................... 10 2015 208 375.6

(51) Int. Cl.
*A47J 31/52*    (2006.01)
*A47J 31/42*    (2006.01)
(Continued)

(52) U.S. Cl.
CPC .............. *A47J 31/42* (2013.01); *A47J 31/44* (2013.01); *A47J 31/461* (2018.08); *A47J 31/468* (2018.08);
(Continued)

(58) Field of Classification Search
CPC ...... A47J 31/525; A47J 31/468; A47J 31/461; A47J 31/42; A47J 31/52; A47J 31/46;
(Continued)

(56) References Cited

U.S. PATENT DOCUMENTS

| 2007/0045170 A1 | 3/2007 | Wawrla et al. |
| 2008/0050480 A1* | 2/2008 | Doglioni Majer .... A47J 31/525 426/231 |
| 2011/0095010 A1* | 4/2011 | Bondarowicz .......... F24H 1/202 219/209 |

FOREIGN PATENT DOCUMENTS

| DE | 10 2013 101 875 A1 | 8/2014 |
| JP | 2005245970 A  * | 9/2005 |
| WO | WO 2008/017182 | 2/2008 |

OTHER PUBLICATIONS

International Search Report with English translation, dated Aug. 8, 2016, pp. 1-5, Issued in International Application No. PCT/EP2016/0598366, European Patent Office, Rijswijk, Netherlands.
(Continued)

*Primary Examiner* — Eric S. McCall
*Assistant Examiner* — Timothy P Graves
(74) *Attorney, Agent, or Firm* — Brinks Gilson & Lione

(57) ABSTRACT

An electrically operated beverage maker, in particular electrically operated coffee machine, having at least one component which is subjected to wear and tear and hence maintenance-relevant, wherein at least one load parameter which characterises an actual wear and tear of the maintenance-relevant component can be determined, and in that at least one reliability parameter of the maintenance-relevant component can be calculated, taking into account the specific load parameter(s) of the maintenance-relevant component.

11 Claims, 8 Drawing Sheets

(51) Int. Cl.
  *A47J 31/44* (2006.01)
  *A47J 31/46* (2006.01)
  *A47J 31/60* (2006.01)

(52) U.S. Cl.
  CPC .............. *A47J 31/52* (2013.01); *A47J 31/521* (2018.08); *A47J 31/525* (2018.08); *A47J 31/5251* (2018.08); *A47J 31/5253* (2018.08); *A47J 31/605* (2013.01)

(58) Field of Classification Search
  CPC ......... A47J 31/44; A47J 31/605; G01R 21/00; G01R 31/2836; G01R 31/2837; G05B 19/048; G05D 23/1951; G06Q 10/20; Y04S 20/36; Y04S 20/38
  See application file for complete search history.

(56) References Cited

OTHER PUBLICATIONS

Japanese Office Action with English translation, issued in JP Application No. 2017-557992, dated Feb. 18, 2020, pp. 1-8, Japanese Patent Office, Tokyo, Japan.

\* cited by examiner

Figure 2

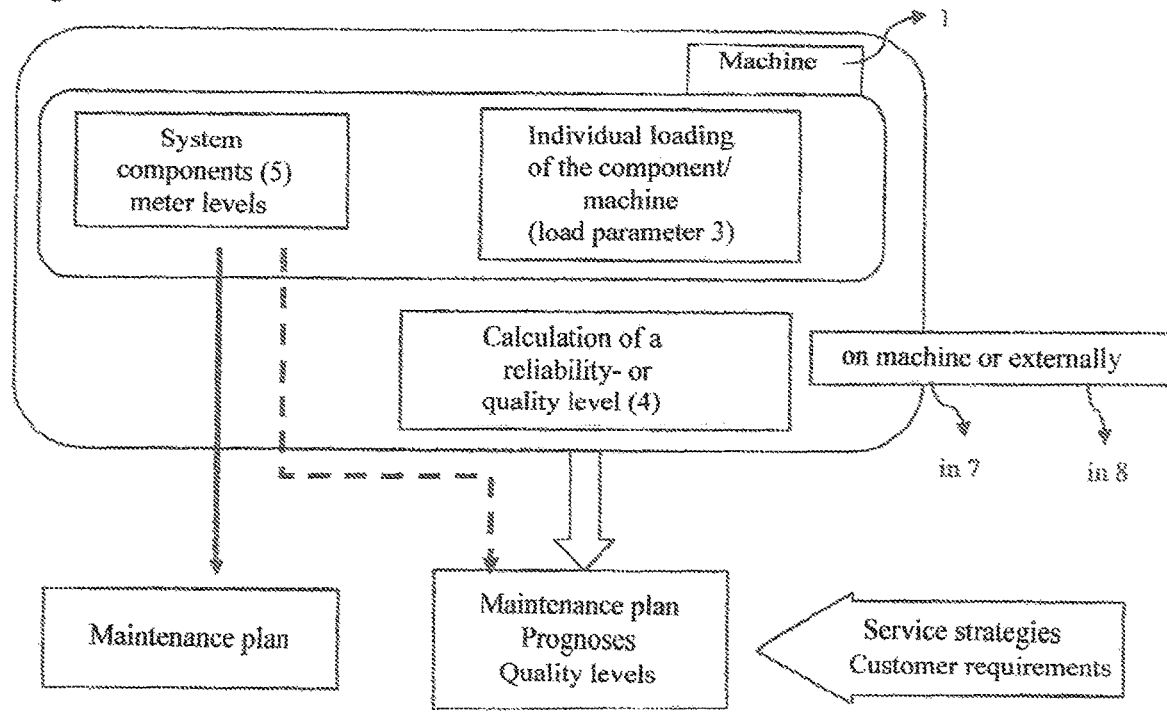

Figure 3

| Phase | A [0, Z_1] | B [Z_1, Z_2] | C [Z_2, Z_3] |
|---|---|---|---|
| Phase description | Good to very good quality, low breakdown numbers breakdown < 2% (12 month value) | Low restrictions, slightly increased breakdown rate, breakdown < 10% | High breakdown probability, risk to man and machine, breakdown > 10% |
| Seal | No to low wear | Wear detectable | High breakdown probability |
| Water filter | Very good water purification ensured | Water purification possibly restricted, filter soon worn out, can be accepted with increased decalcification complexity in the machine | No water purification possible, machine breakdown very probable |
| Grinding disc | Good quality | High dust proportion, brewing process variable | Unacceptable result |
| Rinsing mixer basin | No impairment | Visual deficiencies | Hygiene risk - health risk |
| Milk system cleaning | System i.o. | Germ count acceptable | Hygiene risk - health risk |

| Quality level | | | Possible further subdivision of the quality levels | | |
|---|---|---|---|---|---|
| | | | Phases | Finer subdivision | Or the levels are described in the form of breakdown rates |
| high | + | | | A | |
| | 0 | | A | B | 2% |
| | - | | | C | |
| average | + | | | D | |
| | 0 | | B | E | 10% |
| | - | | | F | |
| low | + | | | G | |
| | 0 | | C | H | 20% |
| | - | | | I | |

Maintenance range

Figure 6

| No. | Function type | Components |
|---|---|---|
| 1 | 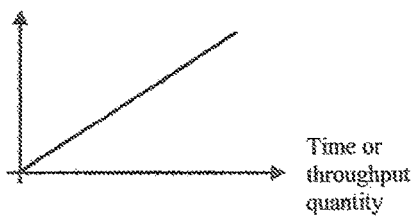 Time or throughput quantity | Wear of a water filter. |
| 2 | 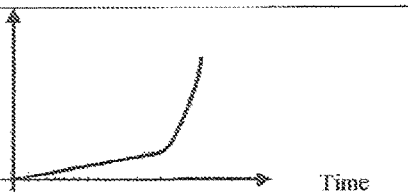 Time | Typical breakdown of a moveable seal: in the first life cycle, a relatively linear breakdown is evident, this then rises rapidly exponentially over time or cycles. |
| 3 | 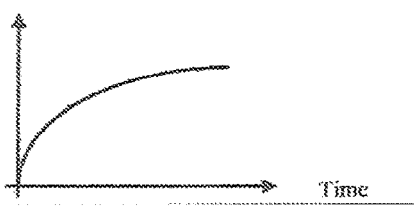 Time | Wear/abrasion of a moveable seal |
| 4 | 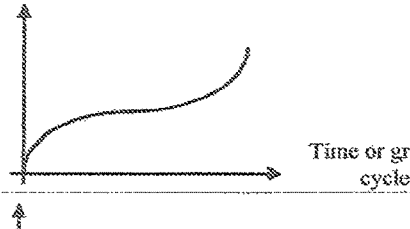 Time or grinding cycles | Wear of a grinding disc |
| 5 | 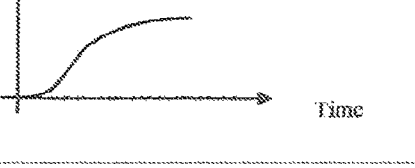 Time | Ageing of a background illumination of a display |

| Component | Base indicator | |
|---|---|---|
| Operating panel | Operating days/month | |
| Grinding discs | Brewing cycles/month | |
| Brewer | Brewing cycles/month | |
| Water filter | Water consumption/month | |
| Mixer system | Brewing cycles/month | |
| Seals water system | Operating days/month | |
| Seals brewing system | Brewing cycles/month | etc. |

Fig. 7a

| Base indicator | Past | Future | |
|---|---|---|---|
| Brewing cycles | X | X' | is prescribed |
| Water consumption | Y | Y'=Y*X'/X | |

Fig. 7b

| Quality level | High | Average | Low |
|---|---|---|---|
| Maintenance display | Good brightness, LED can be dimmed if required per software | With 100% actuation of the background illumination, the display can be read even in a light environment | Display can only be operated in a dark environment |
| Customer A | Reference value | Still acceptable | |
| Customer B | | Reference value | Still acceptable |

Fig. 8a

Configuration for customer A

| | Quality level | |
|---|---|---|
| | Target value | Still acceptable |
| Component 1 | A | B |
| Component 2 | B | C |
| Component 3 | A | B |
| Component 4 | D | E |
| ... | | |

Configuration for customer B

| | Quality level | |
|---|---|---|
| | Target value | Still acceptable |
| Component 1 | B | C |
| Component 2 | A | B |
| Component 3 | A | C |
| Component 4 | C | C |
| ... | | |

Fig. 8b

ELECTRICALLY OPERATED BEVERAGE MAKER (PREFERABLY COFFEE MACHINE) HAVING DYNAMIC MAINTENANCE PLAN GENERATION

CROSS-REFERENCE TO RELATED APPLICATIONS

This application is a 371 nationalization of international patent application PCT/EP2016/059836 filed May 3, 2016, the entire contents of which are hereby incorporated by reference, which in turn claims priority under 35 USC § 119 to German patent application DE 10 2015 208 375.6 filed on May 6, 2015.

TECHNICAL FIELD

The present invention relates to an electrically operated beverage maker (in particular an electrically operated coffee machine) according to the preamble of claim 1. The invention relates, furthermore, to a method for operating such an electrically operated beverage maker.

BRIEF DESCRIPTION OF THE DRAWINGS

FIG. 2 the procedure of the invention when determining reliability parameters;

FIG. 3 an example of the assessment according to the invention of the maintenance requirement of components with phase division;

FIG. 6 examples of breakdown probabilities per time interval as a function of the operational time for various components which can be taken into account, according to the invention, when calculating the reliability parameters of the components;

FIGS. 7a-b examples of base indicators in maintenance-relevant components which can be taken into account when calculating reliability parameters of the components;

FIGS. 8a-b examples of reliability parameters calculated according to the invention and user- or device-specific parameters derived therefrom.

DETAILED DESCRIPTION

Figure 1:
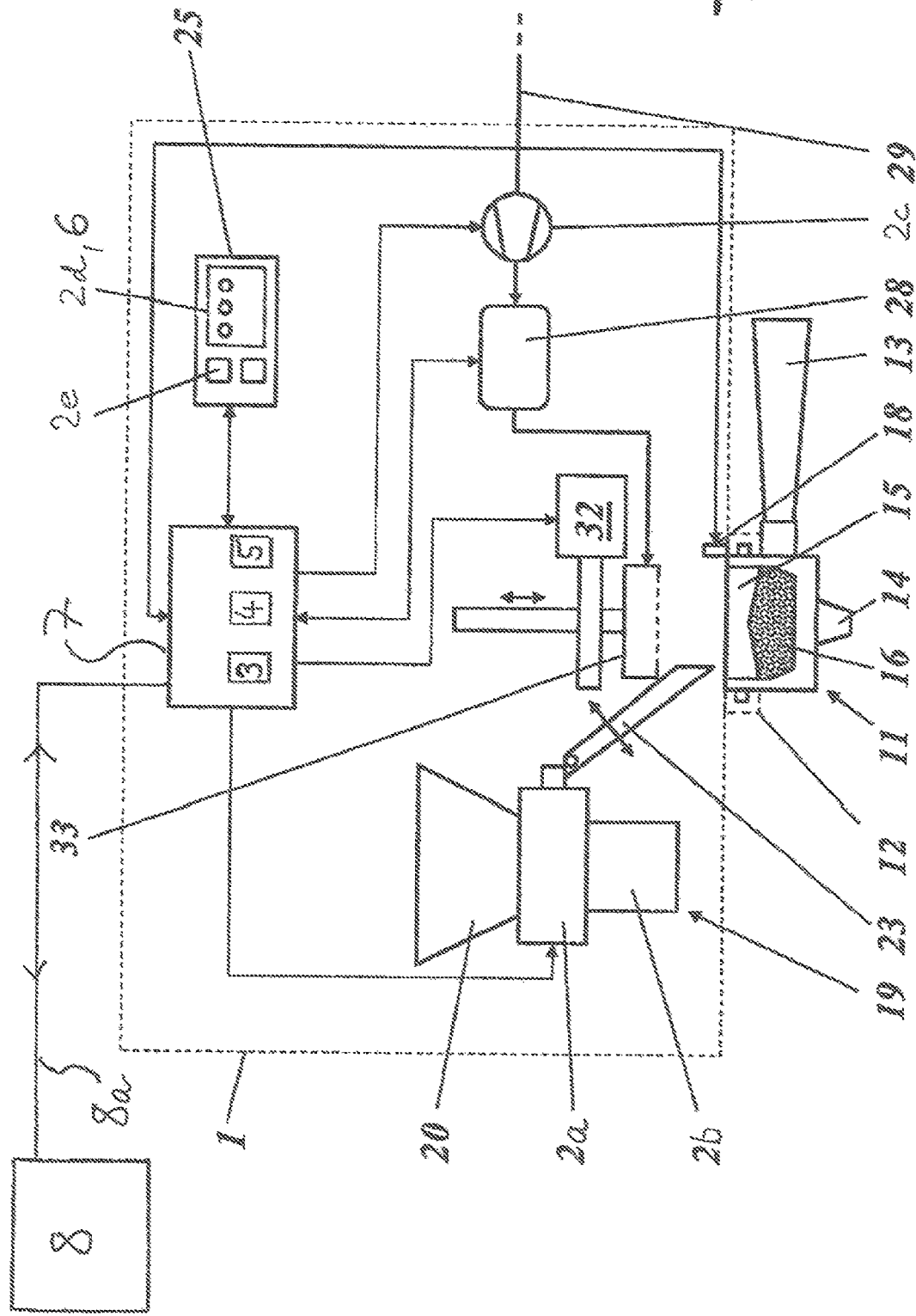
FIG. 1 shows the basic construction of a coffee machine according to the invention.
Figure 4:
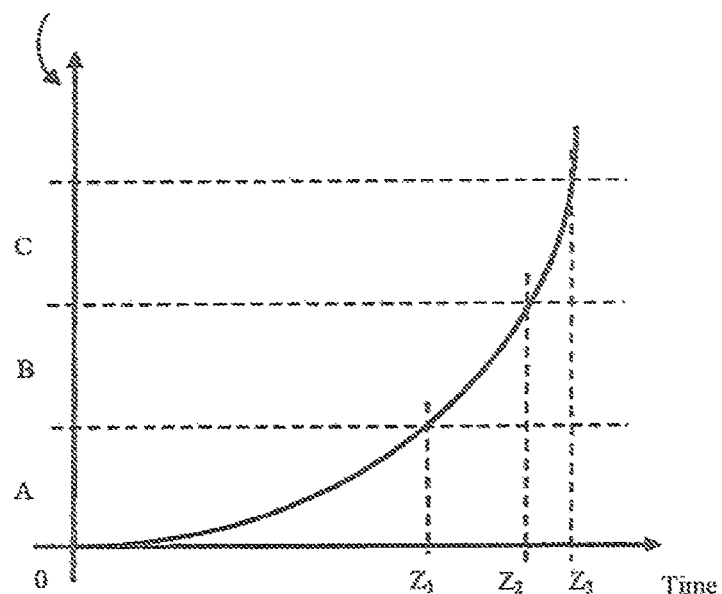
FIG. 4 an example of a reliability parameter according to the invention in the form of a breakdown probability per unit of time as a function of the operational time of the corresponding component.

According to the state of the art, maintenance-relevant parts or components of beverage makers are exchanged after a running time or number of cycles determined for the respective component (the latter expressed e.g. in a number of brewing processes, jointly made already by the respective component, in a coffee machine as beverage maker). On the basis of the running time or the number of cycles, maintenance deadlines can thereby be set such that, taking into account a justifiable expenditure, the beverage maker (subsequently also termed in general machine) has as high as possible reliability. Typical running times can thereby be based on field evaluations or endurance data and are defined on the basis of a typical number of breakdowns as a function of cycles or the running time (for example: 2%). These cycles or running times of components are counted on the machine and, at a time x, a necessary maintenance is then displayed. Example: maintenance of the brewing unit of a coffee machine after a specific number of brewing cycles. "Intelligent" machines often thereby allow a specific "override" of the display that maintenance of a specific component is required. This means that e.g. also a specific number of cycles or a specific running time is possible although in fact a maintenance display is produced, before this component is then blocked by the system itself and/or a compulsory component exchange is demanded.

Starting from this state of the art, it is the object of the present invention to evaluate the maintenance requirement of components of the beverage maker in a more flexible manner. Furthermore, it is the object to calculate or to prognosticate from such a more flexible evaluation the optimum maintenance deadlines for the components.

The starting point for the consideration of the present invention is that the relatively rigid system which is known from the state of the art often does not take into account the fact that components of the beverage maker are subject to different actual loads according to the location and/or operating conditions of the beverage maker, thus components could possibly be longer in operation than indicated solely by their running time or number of cycles (or a customer would possibly consent to certain quality losses in order to save maintenance costs). Likewise, it is difficult to evaluate with the known rigid systems whether another component could possibly last until the next maintenance. The present invention hence begins with the thought also that it is not necessarily the best quality which should be the aim of a maintenance but rather that the aim of a maintenance can also be to ensure reliably adequate quality with optimised costs.

Subsequently, the present invention is described firstly in general then in detail with reference to an embodiment.

Subsequently, the beverage maker is also termed alternatively machine and in particular described by an example of a coffee machine. The beverage maker according to the invention can however likewise concern a beverage maker for other hot drinks (e.g. tea, hot chocolate or drinking soup) or also a beverage maker for preparing cold drinks (e.g. syrup-based drinks).

The term of "load parameter" is subsequently also termed alternatively "load factor". This can thereby concern an individual parameter, however the load parameter of a component can also include a plurality of individual, respectively different aspects of the actual wear and tear of the component under consideration (e.g. wear and tear due to the temperature course and wear and tear due to the pressure course to which a seal of the coffee machine is subjected in the course of the operating time of the machine) or include different components (for example: a plurality of sealing parts on which respectively such a temperature- and/or pressure course is detected over time) of the same describing characteristic numbers.

The load parameter can also be determined in the form of one or more course curve(s) and/or characteristic number(s) derived therefrom (for example the current consumption and the voltage consumption over a defined duration as two behaviour curves, in order to determine or to calculate, as load parameter or load factor of a motor of the grinder of a coffee machine from these behaviour curves, the actually performed electrical work of the motor by means of a central control unit of the machine which is configured as microcontroller). A component according to claim 1 generally concerns a component of the beverage maker, however it can also concern a component of a unit external to the beverage maker which is connected to the beverage maker and cooperates with the latter for the production of a desired drink.

The reliability parameter is subsequently also termed alternatively "reliability- or quality level". The reliability parameter concerns a parameter (in the form of an individual characteristic number or of an individual numerical value, of a multiple n of numerical values or also in the form of one or more behaviour curve(s)) which provides information about the instantaneously given reliability and/or the instantaneously given quality of the component (or also components of the same) and/or about a prognosticated, potential reliability and/or quality of the component. The reliability parameter can hence describe the state of a component with respect to the wear and tear thereof or the state of use thereof. The reliability parameter or the reliability- or quality level can thereby be divided also into a plurality (e.g. 1 to x) of phases.

Also the reliability parameter can thereby be represented as a numerical value or be a numerical value, for example the instantaneously given breakdown probability per time interval (or the breakdown probability up to a calculated time, e.g. a time at which then a maintenance requirement is displayed). The reliability parameter can also assume the form of a breakdown probability course over time (in particular: how a (prognosticated) breakdown probability per unit of time changes over time, i.e. increases). The reliability parameter can therefore also assume the form of a behaviour curve which characterises a maintenance complexity which increases over time (expressed for example in a number of parts of a component to be exchanged). Just as the load parameter, also the reliability parameter can comprise a plurality of individual characteristic numbers. For example, a plurality of characteristic numbers which take into account different reasons for breakdown of a component (for example with respect to different parts of a component, such as for example of the brewing group which can break down). There can also be included in calculation of the reliability parameter of a maintenance-relevant component, one or more specific load parameter(s) of one or more other maintenance-relevant component(s).

From such a reliability parameter, further parameters associated with the requirement for maintenance of the relevant component can then be determined. One example here is determining the time of urgent maintenance of said component if the breakdown probability per time interval for this component exceeds a first predefined value, or also the time of a recommended maintenance of said component if the breakdown probability per unit of time of this component exceeds a second predefined value (the first predefined value being greater than the second predefined value). See in this respect also the subsequent examples.

There is understood, according to the invention, by the term of "maintenance relevance" that the corresponding component (generally after it has been dismantled or removed from the machine) is intended to be maintained by means of repair or is intended to be replaced by a new part of the corresponding component in order to reproduce full functionability or at least a specific minimum functionability of the beverage maker. The beverage maker can have a microprocessor-based, central control unit, by means of which the load parameters and/or the reliability parameters of the maintenance-relevant components can be calculated. There are included in maintenance relevance also maintenance operations which can be implemented by the operator for care of the machine, such as system cleaning or cleaning of individual components. There is therefore understood according to the invention by maintenance or maintenance relevance, what is necessary or helpful in order to reproduce or maintain the correct function of the corresponding component.

There is understood by the actual operational duration (which is subsequently also termed alternatively running time), the summated time duration which indicates how long the component under consideration was actually in operation (e.g. the time duration over which a motor was actually in operation, irrespective of the actual current consumption and voltage consumption thereof during operation, or also the time over which a pressure was applied to a seal, irrespective of the concrete level of the applied pressure). There can be understood by an operational duration characteristic number, for example the number of brewing cycles of an electrical coffee machine as beverage maker (this number is subsequently also termed alternatively cycle number) which the component of the machine under consideration has to date actually passed through.

In contrast to the load parameter, the operational duration or the operational duration characteristic number or the running time or the cycle number do not precisely characterise the actual wear and tear of such a component but merely the time duration over which said component was actually in operation (so that, with this, only a simplified, rough estimation of the actual wear and tear of said component would be possible).

Further advantageously achievable features of the invention can be deduced from claim 3. The features according to claim 3 can thereby be produced irrespective of those of claim 2 (this applies also for the features of all the dependent claims which are also described subsequently), however they can also be produced in combination with said claim 2.

The prescribed properties (which are subsequently also termed alternatively "component setup") can concern in particular measurable technical, e.g. mechanical, electrical or electronic, properties. Examples are the quality of grinding discs of a grinder of a coffee machine, expressed e.g. in the used grinding disc material or in the degree of hardness of the grinding discs. Such predefined properties can however also be stipulated, but not measurable technical properties, such as for example a quality grade of a used seal or a type (type or functioning principle) of a water filter etc.

Operational parameters can thereby be parameters which are determined during operation of the machine (and e.g. with their time-dependent course, are written jointly into a data memory of the machine). Examples of this are the current consumption and the voltage consumption of a motor of the grinder of a coffee machine: as described already, the electrical work performed in fact by the motor can be calculated herefrom and be used for calculation of the reliability parameter of this motor. Likewise, the (instantaneous) brightness of a display of the beverage maker can be detected by means of a photosensor, as a result of which the degree of wear and tear (for example due to soiling and/or also due to reduction in luminosity) of the background illumination of the display can be determined. Pressure- or power sensors can detect mechanical loads (or load courses over time) of components or parts of the same, as a result of which the actual degree of wear and tear thereof can be determined, e.g. in the form of breakage probability increasing with time.

According to claim 6, a maintenance instruction can be (or comprise), in particular a maintenance time, a maintenance recommendation and/or also a maintenance command directed to the beverage maker itself. A maintenance time can be in particular a time at which the reliability parameter calculated for the component as prognosticated breakdown probability course assumes or exceeds or falls below a predefined value. For example, there can then be issued, as accompanying maintenance recommendation on a display of the beverage maker, "component . . . [description of the component] will be expected to fail within the next [=calculated maintenance time] operating hours. Replacing this component is recommended urgently/soon/ . . . [according to the calculated time]."

As maintenance command, for example a command of the type "disconnect beverage maker [or the relevant component] after a further . . . [predefined number of drinks still allowed]" drinks can be generated or codified, which can be displayed in addition also as maintenance recommendation: in such a case, the number of drinks cycles still to be effected is counted and the machine (or the relevant component) is then disconnected automatically when this number is reached until the corresponding component is replaced, repaired, attended to or cleaned.

Also "warning times", calculated as maintenance times, and maintenance recommendations corresponding to these times can be displayed (e.g. "component . . . [relevant component] soon worn out"), without concrete maintenance commands being generated or codified. This enables overrunning of the component, i.e. further use of this component over a specific time duration or number of cycles, although said component is actually already worn out. Hence, the reliability and the quality of a component are all the less (i.e. the breakdown probability of a component is all the higher), the longer this component has been overrun.

There can be understood, according to the invention, by the term of "maintenance requirement", a defined state in which a reliability parameter or reliability- or quality level of this component is no longer achieved.

Maintenance-relevant components can be in particular components, individual parts or functional groups of the beverage maker which, for ensuring the reliability and quality of the beverage maker, require regular maintenance. Examples are water filters, grinders, pumps, fans, seals, display elements, operating elements, outlets etc. There can be understood, according to the invention, by maintenance, an intervention by a service technician (or also an operator) in order to maintain the machine safety and the machine quality.

Environmental conditions are thereby parameters which characterise the actual or planned installation location of the beverage maker. These can be physical parameters (for example air humidity or temperature which can be included in calculation of a reliability parameter for the seals, valves, fans or portioning elements, or also the environmental brightness which can be included in a minimum display brightness as reliability parameter which the display of the machine must still have) or also be chemical parameters (for example: use of the machine in large kitchens or canteens in which a greasy and humid environment is present or use of the machine in areas with low-mineral water which is very aggressive and can attack seals and other materials).

The beverage maker can thereby have corresponding sensors for detecting such parameters (for example ambient temperature sensor or pressure sensor).

The external computing device is subsequently also termed alternatively outsourced system, (external) computer or (external) server.

Determination of a load parameter and the calculation of a reliability parameter are thereby effected preferably for each of the maintenance-relevant components (of a coffee machine as beverage maker) mentioned in this claim.

Subsequently, the present invention is described in detail with reference to an embodiment according to the following FIGS. 1 to 8b.

FIG. 1 shows the construction of a coffee machine 1 according to the invention in a simplified diagram. The basic elements of the coffee machine 1 according to the invention, which do not relate to the present invention, are described on pages 9 up to and including 11 of WO 2013/117362 A1, so that these three description pages, with their entire disclosure content, are jointly included in the embodiment of the present application. The maintenance-relevant components of the present invention which are subjected to wear and tear and which are considered in the present embodiment are thereby the grinder 2a (corresponds to the grinder 21 in WO 2013/117362 A1), the drive motor 2b of the grinder 2a (reference number 22 in WO 2013/117362 A1), the pump 2c (corresponding to reference number 31 in WO 2013/117362 A1) for the boiler 28 of the coffee machine 1, the optical display 2d (corresponds to the display 27 in WO 2013/117362 A1) and the operating unit with push buttons 2e of the coffee machine 1 (corresponds to the operating unit 26 in WO 2013/117362 A1). The maintenance-relevant component 2d or the display is provided here in parallel with the reference number 6 since it is here, on the one hand, itself a maintenance-relevant component, however on the other hand, also serves for issuing maintenance instructions for all maintenance-relevant components 2a to 2e. The unit comprising display 2d or 6 and operating unit 2e is characterised with the reference number 25.

The components (cf. pages 9 to 11 of WO 2013/117362 A1), which are not crucial for the present invention, are as follows: sieve support 11, sieve support mounting 12, handle 13 of the sieve support 11, outlet opening 14 of the sieve support 11, brewing chamber 15, ground coffee 16 (in the sieve support 11), sieve support lock 18, bean container 20, coffee grinder assembly 19 (comprises grinder 2a, drive motor 2b of the same and also bean container 20), chute 23 from the grinder 2a to the sieve support 11, distributer sieve element in the manner of a piston 33, drive unit 32 of the element 33, hot water preparer 28, and also cold water connection of the machine 1 with reference number 29.

There are crucial, according to the invention, in addition to the maintenance-relevant components 2a to 2e, features 3 to 7 of the coffee machine 1, also described subsequently, and also the computing device 8, external to the coffee machine, and also the bidirectional data line 8a which connects this external computing device 8 to the central control unit 7 of the coffee machine 1 (the connection can thereby be effected via the internet). The central control unit 7 thereby corresponds to the central control unit 24 from WO 2013/117362A1 which is extended by corresponding hardware elements and programs according to the present invention. The reference number 3 designates the load parameters which characterise the actual wear and tear of components 2a to 2e. The reference number 4 designates the reliability parameters of components 2a to 2e which are calculated taking into account the respective load parameters 3 of the maintenance-relevant components 2a to 2e by means of the control unit 7. The reference number 5 designates the actual running times of the maintenance-relevant components 2a to 2e (characterising operational duration characteristic numbers 5 of components 2a to 2e, expressed in the respective running time of the considered component). The load parameters 3, reliability parameters 4 and operational duration characteristic numbers 5 are detected or calculated by the control unit 7 and stored in a not-shown data memory of the control unit 7.

There is used as load parameter 3 of the drive motor 2b, according to the invention, for example the actually performed electrical work of the motor 2b calculated from the actual current consumption and the actual voltage consumption over the operational duration of the motor 2b. The current consumption and the voltage consumption are thereby used as operational data which are constantly jointly recorded in the memory of the control unit 7 during operation of the machine 1. The electrical work is then calculated from the motor running time, the current consumption during this running time and the voltage consumption during this running time. As reliability parameter 4 of the motor 2b, there is calculated constantly for example according to the invention from the previously mentioned load parameter 3 of the motor 2b, via the running time of the motor 2b with the control unit 7, the (time-dependent) breakdown probability per unit of time of the motor 2b. As soon as this breakdown probability per unit of time exceeds a predefined value, a corresponding warning notification can be given in the display 6 (e.g. "drive motor of the grinder worn out. Please notify maintenance service").

A further example is the display 2d which decreases in the brightness thereof in the course of time. Here, the luminosity of the background illumination of the display 2d is measured as load parameter 3 of the display 2d by means of a photodiode (not shown). Alternatively, this luminosity can also be calculated from the switched-on time and the brightness value adjusted by the user. This load parameter characterises the ageing process of the display 2d. The load parameter 3 of the display 2d can thereby be used directly as reliability parameter 4 of the display 2d: very generally, in the case of a maintenance-relevant component, the reliability parameter 4 can hence also be identical to the load parameter 3 of the observed maintenance-relevant component. As soon as said load parameter 3 or reliability parameter 4 of the display 2d falls below a predefined value (minimum brightness), it can be issued on the display 2d or 6, as maintenance recommendation "display unit worn out, please exchange component".

Likewise, with suitable sensors (not shown) of the coffee machine 1, there can be measured the wear and tear states of the buttons of the operating unit 2e (e.g. with a noise sensor) and also of the pump 2c (e.g. with a pressure sensor) in order to determine suitable load parameters 3 of these components 2c, 2e, from which then suitable reliability parameters 4 for these two components 2c, 2e can be calculated. The same applies for the grinder 2a which can be measured for example with respect to the state of the grinding discs thereof by means of an optical sensor (not shown). In the case of the grinder 2a, in addition to the detected measured values, the quality (e.g. material quality) of the grinding discs can be included in the load parameter 3 of the grinder 2a. Likewise, measurement of brewing pressure and brewing time is possible: if these increase, the fine dust component of the ground coffee has increased, which is an indicator of wear and tear of the grinding discs.

FIG. 2 shows, on the basis of the determined load parameters 3 and the reliability parameters 4, calculated therefrom, of the maintenance-relevant components 2a to 2e, maintenance plans, breakdown prognoses, quality levels for characterising the instantaneously present component quality etc. can be established, according to the invention, as in the machine according to FIG. 1 (FIG. 2, middle column). Also (via corresponding meter levels which are detected in the control unit 7), the actual operational durations or actually run-through operating cycles of the individual components can thereby be included in the establishment of the maintenance plans, prognoses and/or quality levels (broken-line arrow in FIG. 2). According to FIG. 2, it would also be made easy, when establishing, e.g. a maintenance plan of a component, to take into account exclusively the actual operational duration thereof (FIG. 2 left-hand column): this corresponds to what is already known from the state of the art.

According to the invention, an electrical beverage maker is made possible, which is capable of planning and prognosticating maintenance deadlines or of implementing a method for planning and prognosis of maintenance deadlines. All calculations (e.g. the load parameters 3 and also the reliability parameters 4, possibly also taking into account operational duration characteristic numbers 5 of components 2a to 2e) can thereby be implemented in the control unit 7 of the machine 1 itself. However, it is likewise also possible that only base data are detected by the machine 1 itself and are transmitted via the bidirectional data line 8a (e.g. via the internet) to an outsourced system (central server 8). In the system 8, the corresponding calculations are then implemented and the calculation results, in particular the maintenance instructions determined from the calculated reliability parameters, can be transmitted via the bidirectional data line 8a back to the machine 1 for display on the display 6 thereof. This has the advantage that the calculation of the reliability parameters or of the maintenance information or maintenance prognoses derived therefrom can be adapted according to the latest knowledge respectively on the external server 8 without the programming of the central control unit 7 of the machine 1 requiring to be changed correspondingly at the installation location of the machine 1. (Of course, it is however also possible to change this programming per remote maintenance via the bidirectional data line 8a in the machine 1).

According to the invention, a maintenance requirement of components 2a to 2e can hence be calculated via the respective actual loading thereof, e.g. in the form of wear and tear functions. A maintenance requirement of a maintenance-relevant component can be planned individually by means of one or more reliability parameter(s) assigned to the component. Maintenance ranges and/or maintenance frequencies can be established thereby by target specifications of maintenance costs and/or reliability requirements (e.g. cumulative reliability- or quality level of the machine 1). For calculation of reliability parameters of components, suitable curve functions can thereby be used.

According to the invention, calculation of breakdown prognoses and/or of maintenance times is possible on the machine 1 itself or with the help of an external system 8. Calculated maintenance times and maintenance ranges can be used for planning service intervals and for planning a service network for sold coffee machines 1. Also previously detected operational data can be included in a future maintenance planning via interpolation. Also in the case of producing a prognosis, an altered use behaviour can be taken into account (e.g. different operation of coffee machines in the summer- and in the winter half-year). Different maintenance instructions can be generated from the calculated reliability parameters of different maintenance-relevant components: thus, e.g. for an operating unit of a coffee machine installed inside a building, a different maintenance instruction can be generated than for a coffee machine which is installed outside. Calculations of reliability parameters or of reliability- or quality levels of different components (or of the entire device 1) can be effected in the case of an assumed maintenance deadline. In particular for detecting the actual wear and tear of the maintenance-relevant components, sensors (e.g. noise sensors, pressure sensors, . . . ) can be used.

Hence, according to the invention, for example maintenance of the grinder 2a can be effected taking into account the actual loading of this grinder (which can be different from other components of the machine 1): thus for example, the loading of a grinder or mill thereof is, on the one hand, dependent upon how often the grinder is in fact used (often a plurality of grinders 2a are incorporated into the machine 1 and then have different running times according to the drinks distribution), however, on the other hand, also dependent upon with what actual power (current consumption× voltage consumption) the grinder is operated over what time (indicated e.g. in Wh). As further characteristic number which is involved in the load parameter of the grinder, for example the type of beans used (hard, foreign body content, bean quality) can be taken into account jointly since this also influences the wear and tear on the grinding discs).

According to the invention, determination of reliability parameters of maintenance-relevant components of a beverage maker can be effected on the basis of load factors of the components (which can be determined for example via sensors or can also be read out of the operational data of the machine). In addition thereto, also purely the meter levels or cycle numbers can be taken into account: e.g. number of brewing cycles, number of grinder batches, cycle number of valves, running times of motors, drinks meter levels or the like. Also fixed values (such as e.g. the quality of grinding discs, the type of water filter used . . . ) can be taken into account when determining the load parameters or when calculating the reliability parameters. Such fixed values can also be termed machine setup.

According to the invention, load parameters (load factors) which characterise the actual wear and tear of maintenance-relevant components are taken into account in the calculation of the reliability parameters of the components (e.g. quality level). For example, a seal ages significantly faster with increasing temperature. With the (measured or indirectly determined) temperature course on the seal over time, this factor or this load parameter can be taken into account in the calculation of the reliability parameter of the seal as maintenance-relevant component. As further factor which is involved in the load parameter of the seal, the pressure actually prevailing on the seal over time can be taken into account in the calculation of the reliability parameter. Also caustic solutions or acids (for example during cleaning) damage a seal. Taking into account the time duration and frequency of cleaning as additional factor of the load parameter of the seal can likewise be included in calculation of the reliability parameter of the seal. In the case of a motor (e.g. of the grinder 2a), in addition to purely the switched-on time (running time), current monitoring and voltage monitoring is sensible according to the invention: with this, conclusions can be made about the actually performed electrical work of the motor. Furthermore, also e.g. as further factor of the load parameter of the motor, the starting current of the motor can also be involved in the calculation of the reliability parameter of the motor, in order to evaluate the motor state optimally.

Such factors of load parameters or the load parameters can also often be read out of the operational data of the machine 1 (e.g. from a suitable data memory of the central control unit 7) and can relate in particular also to measured values (example: grinder running time multiplied by current and voltage). As described previously, various factors of the load parameter(s) of the component can be included in the calculation formula for the reliability parameter of a component. For example, the load parameter for the grinding discs of a grinder 2a, in addition to the number of operational cycles 5 which the grinding discs have in fact passed through during brewing, also the proportion (grinder running time) per drink, the type of beans (hard/soft/foreign matter-loaded) and the quality of the grinding discs (favourable, high-quality) can be taken into account jointly. Load parameters or factors of the same can likewise be adapted, just as curve functions (time courses) of load parameters or factors of the same flexibly, according to the latest knowledge: it is thereby advantageous to implement the data processing on the external server 8 (i.e. for example to calculate the reliability parameters from the load parameters on the server 8) and subsequently to display the conclusions from the calculated reliability parameters (in particular: corresponding maintenance instructions) on the display 6 of the machine 1.

According to the invention, for assessment of a maintenance requirement of components, the states or the reliability parameters of components can be divided into a plurality of phases. One criterion as to when a component should be exchanged can be chosen differently. In the case of specific components, the reliable mechanical function is the priority (e.g. in the case of seals) so that only a low breakdown quota or breakdown probability per unit of time can be accepted. Other components can have an insidious effect on the drink quality via wear and tear phenomena (for example: grinding discs in the grinder 2a), which with a certain tolerance of the quality, does not at first represent a strict breakdown criterion. Further components (for example: water filter) function at first relatively reliably over a long time and fail relatively suddenly.

Hence the ordinate (reliability parameter) can be divided into phases over the abscissa (time), i.e. the reliability parameter course for a component, which phases can define different exchange criteria for the component. See in this respect the breakdown probability course per unit of time over time in FIG. 4 with the associated phase division in FIG. 3 (phase A which is present in the time interval of 0 to $z_1$, merges into the phase B and finally into phase C. For example, at the time $z_1$ during the course of phase A for a seal (line 3 in FIG. 3), a first warning as maintenance recommendation could be issued on the display 6 ("seal beginning to wear."). At the time $z_2$, i.e. after the end of phase B, a more urgent maintenance recommendation could be issued on the display 6 ("seal showing detectable wear. Please change."). At the time $z_3$, i.e. at a specific time in phase C or after phase C, an automated disconnection of the machine can be effected on the basis of wear of the seal being no longer tolerable: a corresponding maintenance command can thereby be generated in the control unit 7 which disconnects the function of the machine 1, then at the same time the following being able to be issued on the display 6 as maintenance "recommendation": "Seal worn out. Seal must be replaced before machine can be operated again.".

By means of fine divisions of such phases or sections, maintenance can be well adapted to client requirements. FIG. 3 shows a classification proposal of different phases with examples of maintenance-relevant components (lefthand column from line 3 onwards). According to the invention, a cost-optimised maintenance plan (which comprises few service deadlines per unit of time) can be generated. This can be effected by projection of a deadline as to when a first of the maintenance-relevant components enters phase C. Then a suggestion for the subsequent deadline (for example: one year) can be produced. For such a cost-optimised maintenance, it is now shown which components enter phase B and which phase they would reach. Upon reaching phase C, the respective component is exchanged, the components which are still in phase B can remain.

Likewise, a maintenance plan with reliability-optimised maintenance can be generated. A projection of the deadline can hereby be effected as to when the first of the maintenance-relevant components reaches phase B. Then a suggestion for the subsequent deadline (for example: one year) can be produced. For the reliability-optimised maintenance, it is now shown therefrom which components enter phase B. Also these components are jointly exchanged, differently from the cost-optimised maintenance.

Figure 5A:
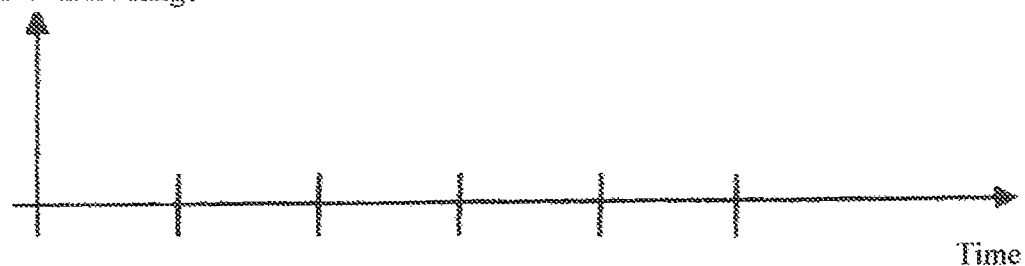
FIG. 5a an example of a possible maintenance event according to the invention with fixed temporal intervals of the maintenance intervals with variable maintenance range according to the maintenance process.

FIG. 5a shows an example of fixed maintenance intervals: the time interval of the individual maintenance deadlines is strictly prescribed, the maintenance range is calculated respectively according to the invention.

Figure 5B:
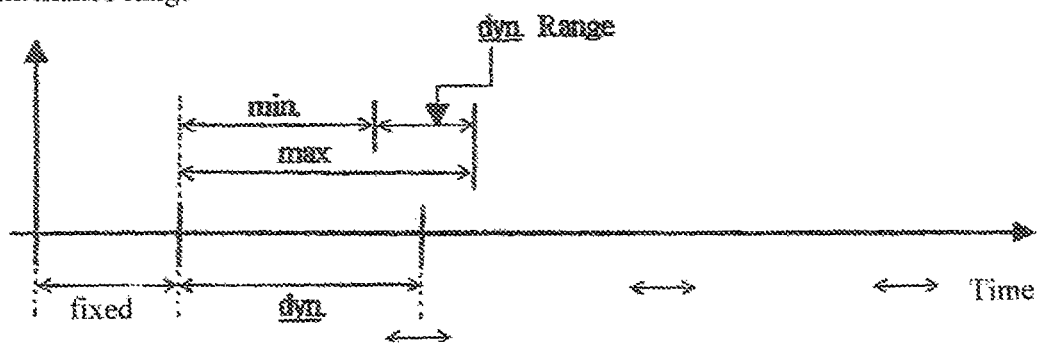
FIG. 5b a further example in which maintenance or the maintenance range is strictly prescribed respectively according to the maintenance procedure, the time intervals between the individual maintenance procedures are however, according to the invention, calculated differently according to the maintenance requirement (starting from the determined load parameter(s)) (dynamic maintenance)

FIG. 5b shows a further example in which the first maintenance is strictly prescribed, the subsequent maintenance deadlines or maintenance intervals are calculated dynamically according to the invention. After evaluation of the first (fixed) maintenance interval, the range and time of the next maintenance is calculated. Compare also the example in FIG. 5c. Correspondingly, after evaluation of the second maintenance interval ("dynamically" in FIG. 5b), respectively the range and the next maintenance time can be calculated etc.

Figures 5C, 5D:
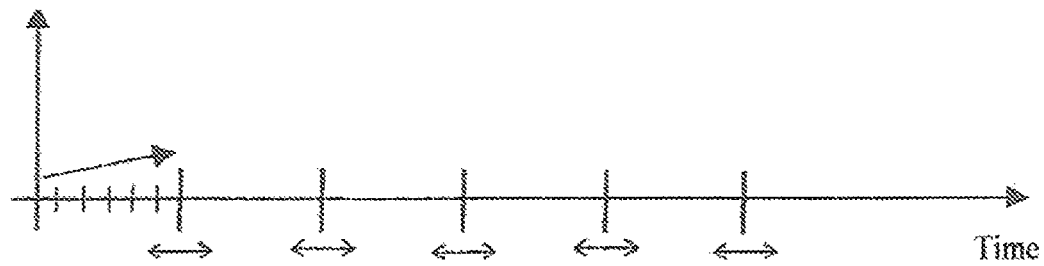
FIG. 5c an example of calculation of the next maintenance time after evaluation of the first, fixed timespan from FIG. 5b.
FIG. 5d a calculation according to the invention of maintenance procedures in which both the time intervals of the individual maintenance procedures and the maintenance range thereof are calculated or varied.

FIG. 5d shows a maintenance plan generation of the present invention in which all maintenance intervals are set dynamically. At the start of use, a running projection for determining the respectively next maintenance time and the respectively next maintenance range can be effected.

FIG. 6 shows that a suitable curve function adapted to the component, can be included in the calculation of the reliability parameter of a component (optimisation for actual conditions). The background here is that not every maintenance-relevant component behaves linearly with respect to its quality (e.g. expressed as breakdown probability per unit of time on the ordinate). Thus, as a function of time (abscissa) or number of cycles, a differently shaped curve function can be included in calculation of the reliability parameter of a maintenance-relevant component. All the already described factors, load parameter, operational data, operational duration and sensor systems can be a component of the curve function. In addition to the two-dimensional examples of curve functions shown in FIG. 6, also multi-dimensional curve functions of the dimension 3 can be taken into account. FIG. 6 shows examples of typical curve functions for various maintenance-relevant components of the coffee machine 1.

Calculation of the reliability parameters (and also possibly parameters derived therefrom, such as e.g. maintenance instructions) can be effected not only in the processor of the central control unit 7 of the machine 1 but also externally (connection via the data line 8a) in an external, outsourced system 8. Thus for example the determination steps for the load parameters 3 of a method according to the invention can be effected by means of the control unit 7 of the machine 1, whilst the calculation steps for the reliability parameters 4 and also the generation steps for the maintenance instructions can be effected on the external system 8. The generated maintenance instructions such as e.g. maintenance times, maintenance recommendations to be displayed or even the maintenance commands directed towards the machine can then be conveyed from the external system 8 via the data line 8a to the central control unit 7. The system 8 can hence communicate with the machine 1 via suitable interfaces. For example, the essential steps of a method according to the invention can be produced as application on the central server 8 which is assigned to maintenance of the machine 1 or of a plurality of machines 1. Data of the machine(s) 1 can be transmitted via RDA modules, Ethernet or even via further normal network communication interfaces to the server 8. Breakdown data, operational parameters, load parameters, detected wear data etc. during maintenance of exchanged components can be stored for a specific machine 1 (or also a machine population comprising a plurality of such machines) in an external data bank on the server 8 and be also evaluated statistically. This can serve for optimisation and updating of data for future calculations (evaluations) of maintenance data of individual components. Planning and prognosis of maintenance deadlines can require specific knowledge of the use behaviour of a machine 1. Such data detected for components in the past can be collected per component for determination of actual wear and tear of maintenance-relevant components (e.g. in a data bank on the server 8) and can be extrapolated into the future with the assumption that also future loads of the machine 1 or of the components 2a to 2e thereof follow the pattern of the past.

If the case now arises that the machine 1 is used entirely differently from in the past (example: an ice cream kiosk had high loading in the summer months, for the forthcoming winter months after maintenance in September, low loading is expected since the ice cream kiosk has opened only for planned visits), then this can also be taken into account: extrapolated parameters (e.g. expected brewing cycles per month, coffee bean use per month etc.) can be manipulated or adapted correspondingly to the expected change in loading and can be taken into account in calculation of wear to be expected in various components (future loading) or the future loading to be expected can be correspondingly calculated.

In practice, this can be implemented by the abscissa of the reliability parameters or of the curve functions (cf. e.g. FIGS. 4 and 6) of each maintenance-relevant component being assigned to a useful base indicator. An example of the assignment of such base indicators is shown in FIG. 7a. Such a base indicator can be detected in the machine data and extrapolated into the future. Base indicators can be advantageously: operational days, brewing cycles, water consumption. The base indicators can thereby be correlated linearly, cf. the example in FIG. 7b.

By input of an expected base indicator (e.g. operational days, water consumption, brewing cycles), a projection for the reliability parameters of all components of the machine 1 can now be effected since the various base indicators of the various components are in a known correlation.

Different requirements entirely can be set for the maintenance-relevant components, as a function of the installation location or the user of the machine 1. Thus a first owner (customer A) can require a very much higher quality level with respect to display brightness with an installation location in a very bright environment than an owner 2 (customer B) who operates the machine 1 in a dark discotheque. Compare FIG. 8a.

Desired reliability parameters (for quality level) per component can be assigned, specific to the device in a customer-specific table. Compare example in FIG. 8b.

With specification of a planned maintenance deadline, conclusions can be drawn in the future also by means of interpolation of data about a reliability- or quality level respectively of the individual components (and hence also about a reliability parameter of the entire machine 1).

In addition to fixed operational data or operational data which can be read out of the machine 1, in particular further wear indicators can determine the actual loading of the maintenance-relevant components or contribute to calculation of the reliability parameters of the components. As an example, conclusions can be drawn about the actual state of the background illumination of the display by means of a measurement of the display brightness. Power sensors can determine the loading of components (example: strain gauges which are applied on components subject to a bending load).

The invention claimed is:

1. An electrically operated coffee machine comprising:
a maintenance-relevant component which is subjected to wear and tear and hence is maintenance-relevant; and
a control unit, wherein the control unit is configured to determine or receive a load parameter, which characterises an actual wear and tear of the maintenance-relevant component,
wherein the control unit is configured to determine, in addition to the load parameter of the maintenance-relevant component, a total running time of the maintenance-relevant component or an operational duration characteristic number which characterizes this total running time,
wherein the control unit is configured to calculate a reliability parameter of the maintenance-relevant component based on
the load parameter of the maintenance-relevant component, and also
the determined total running time or the operational duration characteristic number,
wherein the reliability parameter of the maintenance-relevant component describes the state of the maintenance-relevant component with respect to the wear and tear thereof or the state of use thereof, wherein an increase in the wear and tear indicated by the load parameter of the maintenance-relevant component decreases the reliability parameter otherwise determined only from the determined total running time or the operational duration characteristic number, and a decrease in the wear and tear indicated by the load parameter of the maintenance-relevant component increases the reliability parameter otherwise determined only from the determined total running time or the operational duration characteristic number.

2. The coffee machine according to claim 1, wherein the control unit is configured to also take into account, when determining the load parameter and/or when calculating the reliability parameter of the maintenance-relevant component, a prescribed property of the component.

3. The coffee machine according to claim 1, wherein the control unit is configured to determine the load parameter of the maintenance-relevant component based on an operational parameter detected by maker coffee machine and/or wherein the control unit is configured to determine the load parameter of the maintenance-relevant component based on a sensor of the coffee machine.

4. The coffee machine according to claim 1, wherein the maintenance-relevant component includes a plurality of maintenance-relevant components, wherein for each of the maintenance-relevant components, a respective one or more of a plurality of load parameters characterises the respective component, and wherein the control unit is configured to determine the respective one or more of the load parameters, to calculate a respective reliability parameter from the respective one or more of the load parameters, to receive the receive the respective one or more of the load parameters, and/or to receive the respective reliability parameter calculated from the respective one or more of the load parameters.

5. The coffee machine according to claim 1, wherein the control unit is configured to generate, for the maintenance-relevant component, a maintenance instruction for the maintenance-relevant component from the reliability parameter, or the control unit is configured to receive, for the maintenance-relevant component, the maintenance instruction for the maintenance-relevant component from the reliability parameter.

6. The coffee machine according to claim 1, wherein the calculation of the reliability parameter of the maintenance-relevant component takes into account an environmental condition.

7. The coffee machine according to claim 1, wherein the control unit of the coffee machine is configured to perform the determination of the load parameter of the maintenance-relevant component and/or the calculation of the reliability parameter of the maintenance-relevant component, or
wherein the control unit of the coffee machine is configured to cause a transmission of data necessary for the determination of the load parameter of the maintenance-relevant component and/or for the calculation of the reliability parameter of the maintenance-relevant component to an external computing device and wherein, after said transmission, the determination of the load parameter of the maintenance-relevant component and/or the calculation of the reliability parameter(s) of the maintenance-relevant component is effected in this external computing device, before a transmission of the determination and/or calculation results is made to the coffee machine.

8. The coffee machine according to claim 1, wherein the maintenance-relevant component includes at least one of:
a grinder,
a motor,
a pump,
a seal,
a valve,
a display element,
an operating element,
a filter,
a cooling element, a fan,
or
an outlet.

9. The beverage maker coffee machine according to claim 5, wherein the control unit is configured to issue the maintenance instruction and/or to cause the maintenance instruction to be displayed on a display of the coffee machine.

10. A method for operating an electrically operated coffee machine, which has a maintenance-relevant component which is subjected to wear and tear and hence is maintenance-relevant, the method comprising:
- determining, for the maintenance-relevant component, a load parameter which characterises/characterise an actual wear and tear of the respective maintenance-relevant component; and
- determining, in addition to the load parameter of the maintenance-relevant component, a total running time of the maintenance-relevant component or an operational duration characteristic number which characterizes this total running time, and
- wherein, for the maintenance-relevant component, a reliability parameter is determined by
- the load parameter of the maintenance-relevant component, and also
- the determined total running time or the operational duration characteristic number; an wherein the reliability parameter of the maintenance-relevant component describes the state of the respective maintenance-relevant component with respect to the wear and tear thereof or the state of use thereof, wherein an increase in the wear and tear indicated by the load parameter of the maintenance-relevant component decreases the reliability parameter otherwise determined only from the determined total running time or the operational duration characteristic number, and a decrease in the wear and tear indicated by the load parameter of the maintenance-relevant component increases the reliability parameter otherwise determined only from the determined total running time or the operational duration characteristic number.

11. The method according to claim 10 further comprising predicting maintenance time/times for the maintenance-relevant component(s).

* * * * *